United States Patent [19]
Yoshida et al.

[11] 4,078,427
[45] Mar. 14, 1978

[54] ULTRASONIC FLOW OR CURRENT METER

[75] Inventors: Yukio Yoshida, Yokohama; Kazushi Suga, Yocho, both of Japan

[73] Assignee: Kabushikikaisha Tokyo Keiki, Tokyo, Japan

[21] Appl. No.: 591,039

[22] Filed: Jun. 27, 1975

Related U.S. Application Data

[63] Continuation-in-part of Ser. No. 405,144, Oct. 10, 1973, abandoned.

[30] Foreign Application Priority Data

Oct. 12, 1972 Japan .............................. 47-102098

[51] Int. Cl.$^2$ .............................................. G01F 1/66
[52] U.S. Cl. ................................................. 73/194 A
[58] Field of Search ..................................... 73/194 A

[56] References Cited

U.S. PATENT DOCUMENTS

| | | | |
|---|---|---|---|
| 3,329,017 | 7/1967 | Yamamoto et al. ............... | 73/194 A |
| 3,715,709 | 2/1973 | Zacharias, Jr. et al. ........... | 73/560 |
| 3,729,993 | 5/1973 | Eck et al. .......................... | 73/181 |
| 3,869,915 | 3/1975 | Baumoel ............................ | 73/194 A |

Primary Examiner—Charles A. Ruehl
Attorney, Agent, or Firm—Hill, Gross, Simpson, Van Santen, Steadman, Chiara & Simpson

[57] ABSTRACT

An ultrasonic flow or current meter having at least one pair of transducers, a transceiver which applies a pulse signal to one of the transducers to produce an ultrasonic pulse wave, the other transducer receiving the ultrasonic pulse wave and producing the corresponding electrical signal, a reference pulse signal generator, a counter for counting the pulse signals from the reference signal generator in relation to the corresponding electrical signal, and a logical operational circuit. The logical operational circuit is supplied with the output signal from the counter and calculates a difference between a first reciprocal of a time required for the ultrasonic pulse wave to propagate from one of the pair of transducers to the other transducer and a second reciprocal of a time required for the ultrasonic pulse wave to propagate in the reverse direction between the pair of transducers, with the difference between the first and second reciprocals being multiplied by a constant.

4 Claims, 15 Drawing Figures

ULTRASONIC FLOW OR CURRENT METER

CROSS-REFERENCE TO RELATED APPLICATIONS

This application is a continuation-in-part application of U.S. Ser. No. 405,144 filed Oct. 10, 1973, now abandoned.

BACKGROUND OF THE INVENTION

1. Field of the Invention

The present invention relates in general to an ultrasonic flow or current meter and more particularly to an ultrasonic flow or current meter which is simple in circuit construction but can quickly measure with high accuracy.

2. Description of the Prior Art

In ultrasonic flow meters, there have been widely used a time difference method and a frequency difference method. The theory of these two methods, the construction of the ultrasonic flow meter used for practising the methods and their advantages and defects will be described briefly.

First, the theory of the time difference method will be described. When an ultrasonic wave propagates or transmits through a fluid, its apparent velocity of propagation differs depending upon whether the fluid is at rest or is moving. If it is assumed that the velocity of sound (ultrasonic wave) in a fluid at rest is taken as $c$ and the velocity of a moving fluid is taken as $u$, the apparent velocity of the sound is $(c + u)$ when the propagation direction of the sound coincides with the flow direction of fluid, but becomes $(c - u)$ when the propagation direction of sound is opposite to the direction of flow of the fluid.

It is assumed that a pair of ultrasonic transducers (ultrasonic probes) $P_1$ and $P_2$ are mounted on a pipe P, through which a fluid F may flow, with a distance L therebetween and that an ultrasonic wave U is propagated along a direction with an angle $\theta$ to a flow direction FD of the fluid F in the pipe P as shown in FIG. 1. In this case, the propagation time interval of ultrasonic wave U emitted, for example, from the transducer $P_1$ and arriving at the transducer $P_2$ is $t_1$ and the traveling time interval of the ultrasonic wave U emitted, for example, from the transducer $P_2$ and arriving at the transducer $P_1$ is $t_2$, which are obtained from the following equations (1):

$$t_1 = \frac{L}{c + u\cos\theta} \\ t_2 = \frac{L}{c - u\cos\theta} \quad (1)$$

Where, if the condition $c^2 >> u^2\cos^2\theta$ is satisfied, the following equation (2) can be derived from the equation (1):

$$u = \frac{c^2}{2L\cos\theta}(t_2 - t_1) \quad (2)$$

Accordingly, the flow velocity $u$ of fluid F can be obtained from equation (2).

In fact, the time difference $\Delta t$ between the time intervals $t_1$ and $t_2$ ($\Delta t = t_2 - t_1$) is very short, so that different methods have been considered for the measurement of such a short time difference. With this method, as apparent from the equation (2), the measured value of the flowing velocity $u$ varies when the velocity $c$ of sound in the fluid F changes. In general, the velocity of sound through a liquid or gas changes a great deal in response to the temperature changes of the liquid or gas, and further if foreign substances and/or bubbles exist in the liquid or the composition of the liquid changes, the velocity of sound therethrough changes much more. Therefore, it is necessary to compensate for such veocity changes.

With reference to FIG. 2, the time difference method of the prior art will be described. In the figure, reference numeral 1 designates a transceiver to which the ultrasonic probes $P_1$ and $P_2$ are connected respectively, 2 a clock pulse generator and 3 a gate circuit which passes the clock pulse from the clock pulse generator 2 to an up-down counter 4 and is supplied with the gate signal from the transceiver 1. The gate circuit 3 is opened or is made conductive for the time period starting from the transmission of an ultrasonic wave pulse from one of the ultrasonic probes $P_1$ and $P_2$ until the reception of the ultrasonic signal by the other of the ultrasonic probes $P_1$ or $P_2$, that is, the time period which is required for the ultrasonic wave to travel through a fluid to be measured between the positions where the ultrasonic probes $P_1$ and $P_2$ are located. The up-down counter 4 produces an output which is proportional to the difference between the propagation times of ultrasonic waves through the fluid between the probes $P_1$ to $P_2$ and to the direction between $P_2$ and $P_1$. The output from the up-down counter 4 is fed to a memory circuit 5 and stored therein. The output from the memory circuit 5 is applied through a D-A converter 6 to an indicator 7 which then indicates the flow rate. The output from the memory circuit 5 is also applied through an accumulating circuit 8 to an integrating meter 9 which indicates an integrated value of flow rate which gives quantity of flow. In FIG. 2, reference numeral 10 indicates a timer which is controlled by the output from the clock pulse generator 2 and controls changes of adding and subtracting operations of the up-down counter 4 and also controls the transfer of the output from the memory circuit 5.

The ultrasonic flow meter using the time difference method described above has the advantage that it is simple in construction as compared with that of the frequency difference method described later on, but it has the drawback that the measured value is apt to be affected by the velocity of sound through the fluid to be measured.

Next, the theory of the frequency difference method will be described. The frequency difference method usually employs a so-called sing-around method.

In FIG. 1, if an ultrasonic pulse wave is emitted from the ultrasonic probe $P_1$, it is received by the other ultrasonic probe $P_2$ after a predetermined time interval. Then, the received signal is converted to a corresponding electrical pulse signal which is amplified and then applied to the probe $P_1$ and emitted as an ultrasonic pulse wave. Thus, the ultrasonic pulse wave and electric pulse signal sing around the path from the probes $P_1$ to $P_2$ through the fluid F, the probe $P_2$ and an electrical circuit (not shown in FIG. 1). In this case, the time interval required for the pulses to circulate the path is substantially determined by the time period within which the ultrasonic wave propagates through the fluid. Accordingly, the repetition frequency $f_1$ is given by the following equation (3):

$$f_1 = \frac{1}{t_1} = \frac{c + u\cos\theta}{L} \quad (3)$$

Similarly, a repetition frequency $f_2$ in the case where the ultrasonic pulse and electrical pulse sing around the path from the probes $P_2$ to $P_1$ through the fluid F, the probe $P_1$ and the electrical circuit can be expressed as follows:

$$f_2 = \frac{1}{t_2} = \frac{c - u\cos\theta}{L} \quad (4)$$

Thus, a difference $\Delta f$ between the frequencies $f_1$ and $f_2$ can be expressed as follows:

$$\Delta f = f_1 - f_2 = \frac{2u\cos\theta}{L} \quad (5)$$

Accordingly, it will be apparent from the equation (5) that the flow velocity $u$ of the fluid F can be obtained by measuring the difference $\Delta f$ based upon the equation (5).

Since the equation (5) has no factor relating to the sound velocity $c$ in the fluid F, the method is not influenced by the sound velocity changes in the fluid F, that is, no measurement error is caused even if the sound velocity $c$ in the fluid F changes. For this reason, this method is primarily used in the art.

An ultrasonic flow meter of the frequency difference method will be now described with reference to FIG. 3 in which reference numerals corresponding to those in FIG. 2 indicate the corresponding elements.

In the example shown in FIG. 3, the ultrasonic pulse wave and electrical pulse are circulated from one of the ultrasonic probes $P_1$ and $P_2$ to the other thereof by the transceiver 1 and electrical pulses in one period or more within a predetermined time interval are fed from the transceiver 1 to a frequency multiplier 12. The frequency multiplied electrical pulses are then applied to the up-down counter 4, which produces an output corresponding to the difference between the multiplied pulse numbers in a predetermined time period in the direction from the probes $P_1$ to $P_2$ and vice versa. The output from the up-down counter 4 is supplied to the memory circuit 5 and then stored therein. The output from the memory circuit 5 is applied through the D-A converter 6 to the indicator 7 and indicated and also through the accumulating circuit 8 to the integrating meter 9 to be indicated as an integraded value or flow amount. In this example, the timer 10 controls the transceiver 1, the up-down counter 4 and the memory circuit 5.

The prior art ultrasonic flow meter shown in FIG. 3 has the advantage that it is not aflected by the sound velocity in the fluid which may change in accordance with the changes of the temperature, composition and the like of the fluid through which the sound travels, but has the drawback that its circuit construction becomes complicated as compared with that of the flow meter belonging to the time difference method and hence it becomes expensive.

Further, since the meter shown in FIG. 3 is required to increase the multiplication (for example 300~2000 times) so as to obtain a predetermined resolution, the meter, especially its circuit becomes unstable. Also, great skill is required to set the scale factor of the circuit, much time is needed for adjustment of equipment and changing the scale factor, the measuring time becomes long (for example, 1~ several seconds), and the response deteriorates.

SUMMARY OF THE INVENTION

An ultrasonic flow or current meter according to the present invention includes at least one pair of transducers, a transceiver for applying a pulse signal to one of the transceivers to produce an ultrasonic pulse wave, the other transducer receiving the ultrasonic pulse wave and then producing the corresponding electrical signal, a reference signal generator, a counter for counting the pulse signals from the reference signal generator with respect to time, and a logical operational circuit which is supplied with the output signal from the counter and calculates a difference between a first reciprocal of time required for the ultrasonic pulse wave to propagate from one of the pair of transducers to the other transducer and a second reciprocal of time required for the ultrasonic pulse wave to propagate reversely between the pair of transducers with the difference between the first and second reciprocals being multiplied by a constant.

Accordingly, it is an object of the present invention to provide an ultrasonic flow meter free from the drawbacks encountered in the prior art.

It is another object of the present invention to provide an ultrasonic flow meter which is not affected by the acoustic characteristics of fluid to be measured.

It is a further object of the present invention to provide an ultrasonic flow meter which can perform rapid measuring with a simple circuit construction.

The other and additional objects, features and advantages of the present invention will become apparent from the following description taken in conjunction with the accompanying drawing.

DESCRIPTION OF THE PREFERRED EMBODIMENT

Figure 4:
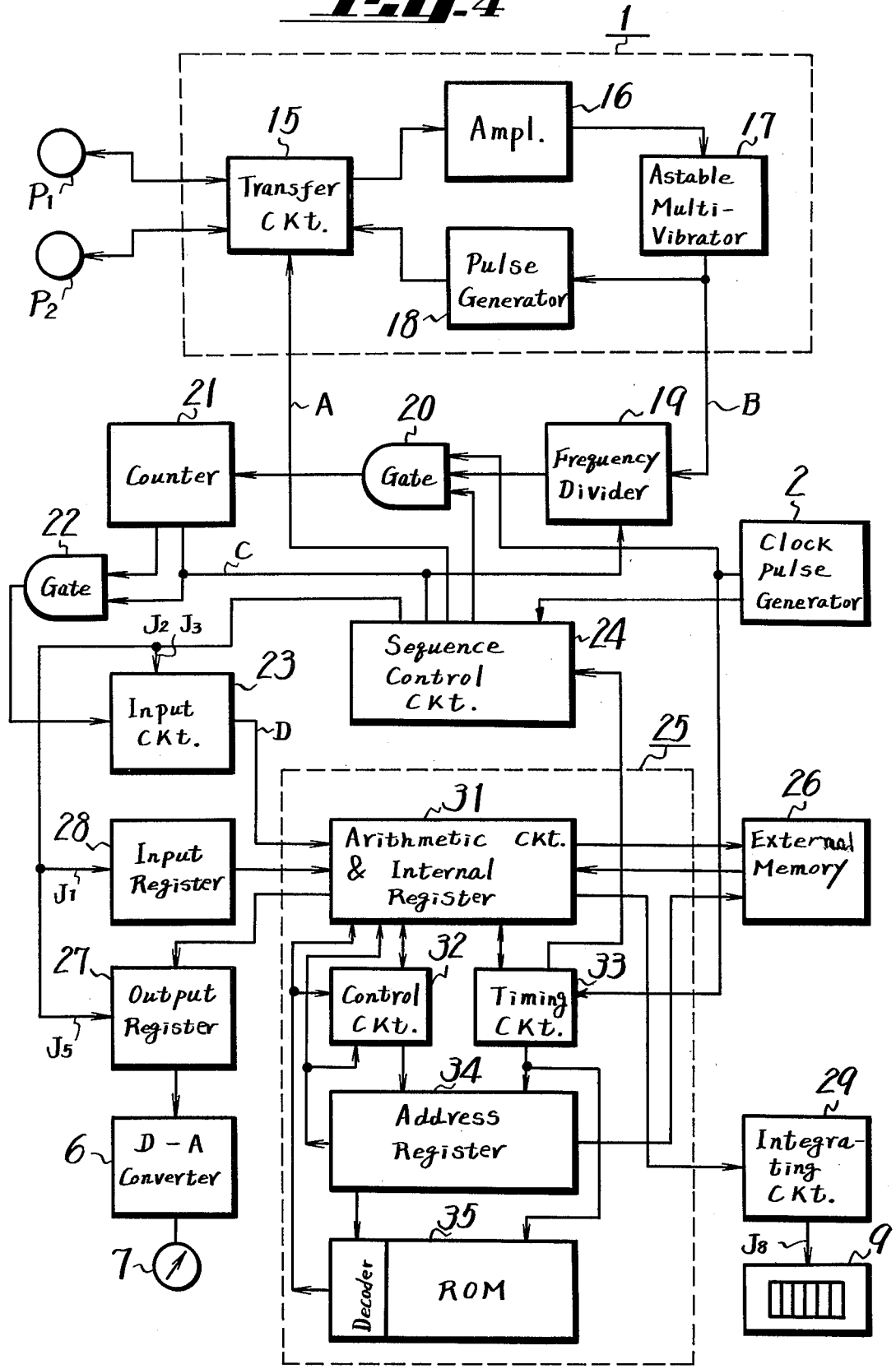
FIG. 4 is a block diagram for showing an example of the ultrasonic flow meter according to the invention.
Figure 5:
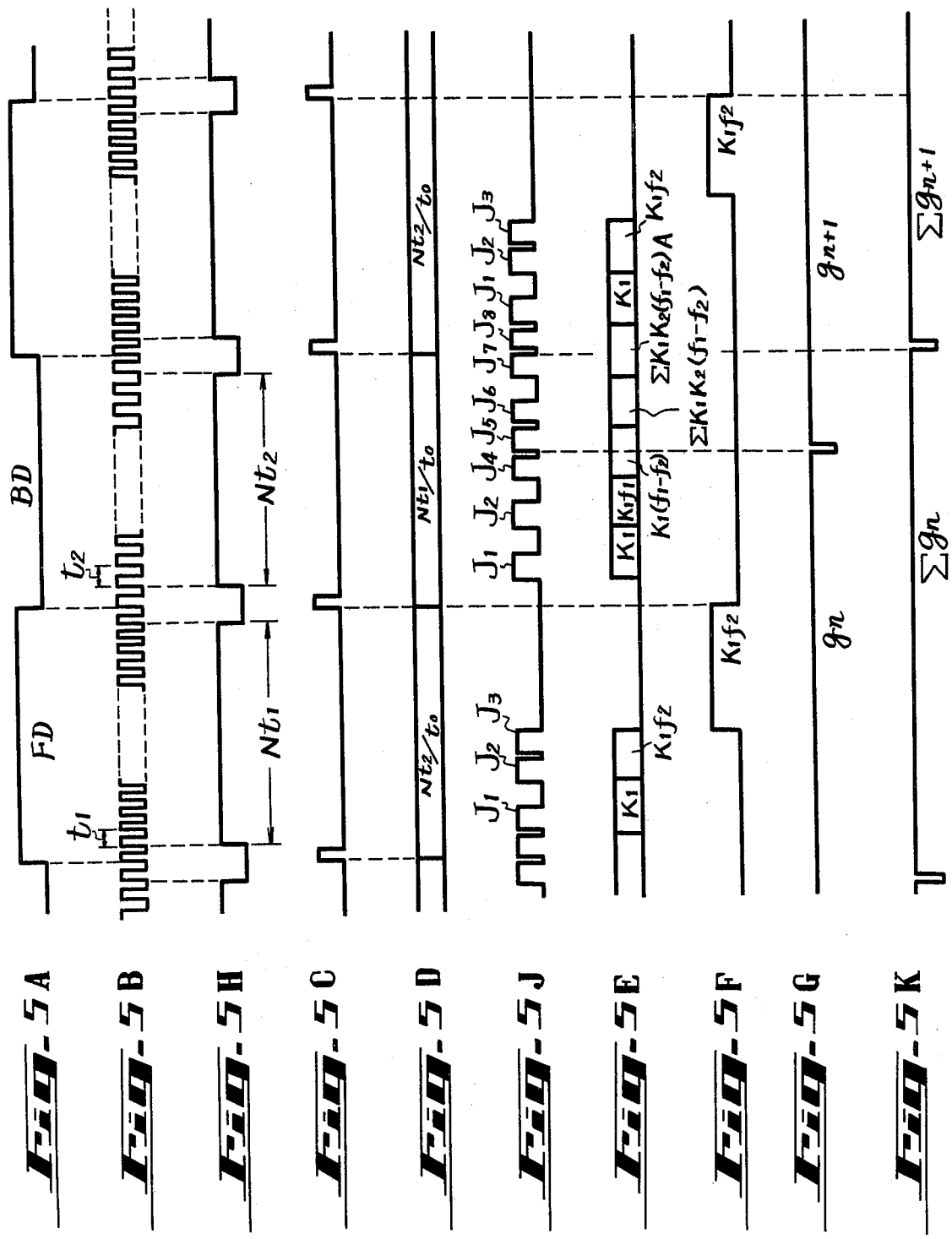
FIGS. 5A to 5K, inclusive, are timing charts used for explanation of the ultrasonic flow meter.
Figure 6:
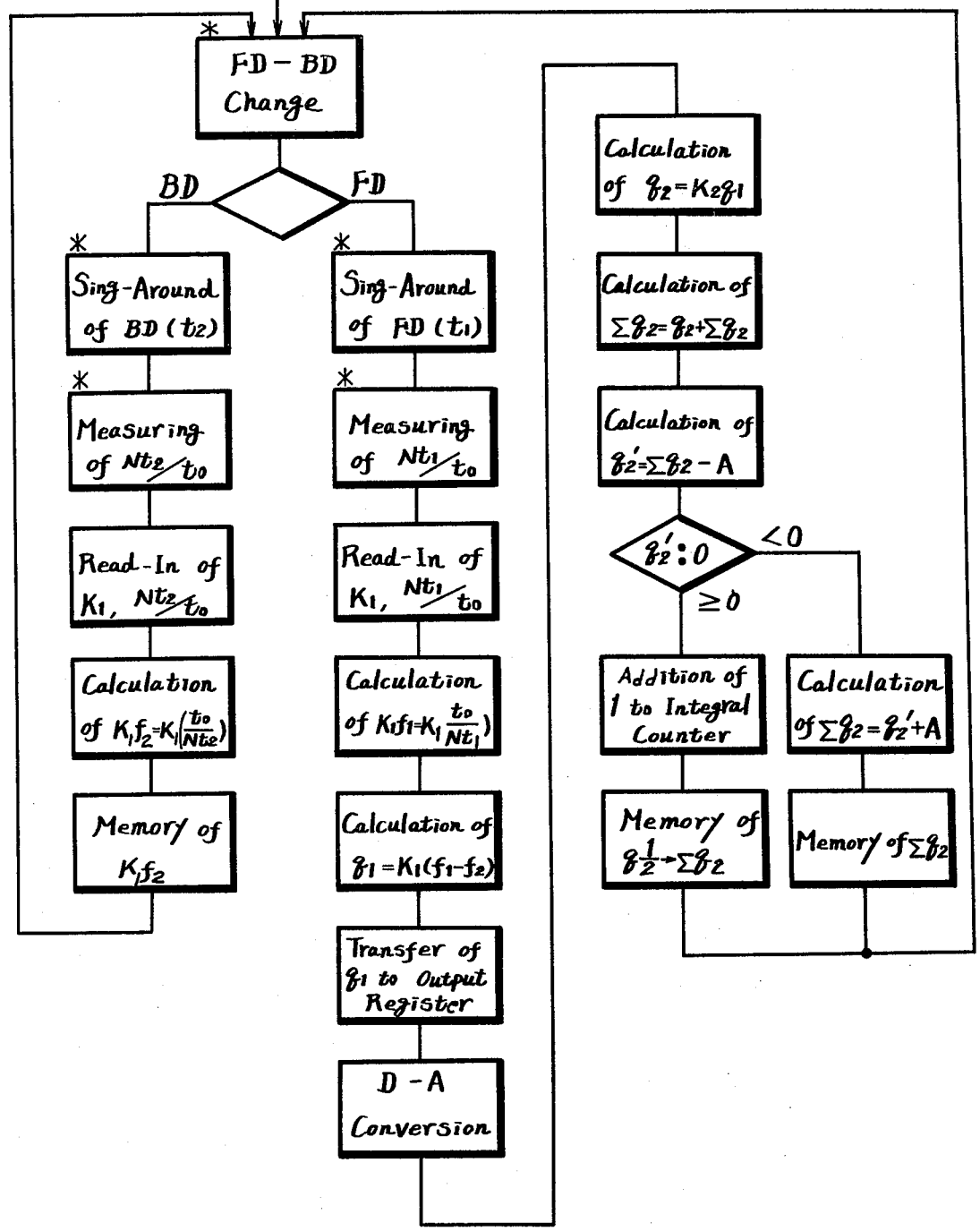
FIG. 6 is a block diagram illustrating operation of the invention.

A description will hereinafter be given on one embodiment of this invention with reference to the drawings. FIG. 4 is a block diagram showing one embodiment of this invention in detail, FIG. 5 is a series of timing charts, and FIG. 6 is a flow chart showing the sequence of operations.

In FIG. 4, reference numeral 1 designates a transceiver as a whole to which there are connected ultrasonic probes $P_1$ and $P_2$ serving as a transmitter and a receiver, respectively. The probes $P_1$ and $P_2$ are the ultrasonic wave transmitter and receiver or the ultrasonic wave probes for transmitting an ultrasonic wave and receiving the same.

The transceiver 1 performs a sing-around operation and is composed of a transmitting-receiving transfer circuit 15 connected to probes $P_1$ and $P_2$ and which is connected to a receiving amplifier circuit 16 and a transmitting pulse generator circuit 18. An astable multivibrator 17 is connected to receive input from amplifier 16 and supplies an input to pulse generator 18.

The transfer circuit 15 switches the input side of the receiving amplifier circuit 16 and the output side of the transmitting pulse generator circuit 18 at predetermined time intervals to a forward direction FD (where the ultrasonic pulse travels from $P_1$ to $P_2$, by way of example) and a backward direction BD (where the ultrasonic pulse travels from $P_2$ to $P_1$) as shown in FIG. 5A due to an output signal A of a sequence control circuit 24 which will be described later. The astable multivibrator 17 is selected to have its self-running oscillation period slightly longer than the propagation period of the ultrasonic wave between the probes $P_1$ and $P_2$. The output signal or electrical pulse from the receiving amplifier circuit 16 is applied to the astable multivibrator 17 to control its external sychronization. The oscillation output signal B (FIG. 5B) from the astable multivibrator 17 is fed to the pulse generator circuit 18 which then generates a pulse at a time corresponding to, for example, the rising edge of its oscillation output signal.

If it is now assumed that the transfer circuit 15 is in a condition of forward direction FD and an output pulse from the pulse generator circuit 18 is applied to the probe $P_1$, an ultrasonic wave pulse is emitted from the probe $P_1$ and travels through tube — fluid —tube to the probe $P_2$. The ultrasonic wave pulse is converted into an electrical pulse signal by the probe $P_2$ and the converted pulse signal is fed through the transfer circuit 15 to the receiving amplifier circuit 16 where it is amplified to trigger the astable multivibrator 17 again. Thus, the astable multivibrator 17 continues to oscillate for a period which is substantially the same as the time period required for the ultrasonic wave signal to travel between the probes $P_1$ and $P_2$. The oscillation period of the astable multivibrator 17 is varied according to the propagation direction of the ultrasonic wave pulse between the probes $P_1$ and $P_2$, that is the forward direction FD and the backward direction BD and the oscillation period in each period is changed corresponding to the velocity of the fluid. FIG. 5B shows the above conditions. In FIG. 4, reference character B is used to show that on the line from the astable multivibrator 17 there appears the waveform shown in FIG. 5B. In the following description, the like reference characters represent similar means.

The oscillation output signal from the astable multivibrator 17 is fed also to a frequency divider 19 and divided at a predetermined ratio N. Therefore, the output of the frequency divider 19 is converted to a rectangular wave signal having a period of $Nt_1$ or $Nt_2$ as shown in FIG. 5H where $t_1$ and $t_2$ are sing-around periods of the transfer circuit 15 in its FD and BD conditions, respectively. The above rectangular wave signal is then delivered to a gate circuit 20. The gate circuit 20 is supplied with signals from the frequency divider 19, a clock pulse generator 2, and the sequence control circuit 24, respectively. Gate 20 supplies a clock pulse of period $t_o$ from the clock pulse generator 2 to a counter 21 during a time period where an output from the frequency divider 19 is present or during a period of $Nt_1$ or $Nt_2$ in accordance with the instructions of the sequence control circuit 24. The sequence control circuit 24 produces a sequence signal for the whole operation of this apparatus, which will be described later in detail. As a result, the gate 20 derives therefrom $(Nt_1/t_o)$'s or $(Nt_2/t_o)$'s number of pulses in response to the operation of the transfer circuit 15 at every predetermined time interval and these pulses are counted by the counter 21.

Reference numeral 22 represents a transfer gate circuit which is fed a transfer pulse from the sequence control circuit 24 at every constant period and passes therethrough the output signal from the counter 21 to an input circuit 23 in parallel shift manner. FIG. 5C shows a transfer pulse which is produced at a time when the counting at the counter 21 is completed. Meanwhile, after the completion of the above transfer operation the counter 21 is reset, and the frequency divider 19 performs the frequency dividing operation in synchronism with the time corresponding to the rising edge of the oscillation output signals successively generated from the astable multivibrator 17.

Reference numeral 25 denotes an operational section which is supplied with output signals from the input circuit 23, an input register 28, the clock pulse generator 2 and an external memory 26, respectively, and which supplies output signals to the sequence control circuit 24, an output register 27, the external memory 26 and an integrating circuit 29, respectively. The operational section 25 has the same construction and function as that of an ordinary microcomputer or calculator.

One example of the operational section 25 will now be described. The operational section 25 is mainly composed of an arithmetic circuit and internal register 31, a control circuit 32, a timing circuit 33, an address register 34 and a read only memory (ROM) 35 with a decoder. The arithmetic circuit and internal register 31 is supplied with data from the input circuit 23, the input register 28 and the external memory 26 and supplied data to the external memory 26 and carries out four arithmetical operations on data in the arithmetic circuit and internal register 31 and judges the magnitude relationship and the positive or negative values of numeral of the data r. The timing circuit 33 is supplied with an output signal from the clock pulse generator 2 and produces pulse signals required for the controlling operation timing of the respective portions in the operational section 25. In addition, the timing circuit 33 supplies an output signal to the sequence control circuit 24. The address register 34 serves to supply the address of instructions stored in the ROM 35, and supplies its output to the arithmetic circuit and internal register 31, the ROM 35, the control circuit 32 and the external memory 26, respectively. The ROM 35 with the decoder is a memory to store and remember the program of functions necessary for the operational section 25 at every step, in which the decoder decodes the content of the stored programs to control the arithmetic circuit 31 and the control circuit 32 according to the respective functions. The control circuit 32 serves to temporarily store the judging functions of the arithmetic circuit 31, the branch instruction of each step of the ROM 35, and the like to control subsequent operations in addition to the above described operations.

The sequence control circuit 24 is controlled by a signal from the operational section 25 thereby to control the above-mentioned transfer circuit 15, gate circuit 20, counter 21, transfer gate circuit 22, input circuit 23, input register 28 and output register 27, respectively. The external memory 26 stores various data, constants and the like for the operational process. The input register 28 supplies the arithmetic circuit 31 with constants determined by the application condition of this apparatus, for example, the diameter of the pipe, the thickness of the pipe and its material. Also, the measuring range, the minimum value of integrated flow or the like are furnished by register 28. The input register 28 can be replaced by the external memory 26, but it is desireable to provide it separately for ease of replacement of gates. A magnetic core write-in circuit, a semiconductor memory circuit, a key-board, a pin-board, or the like can be properly used as the input register 28. The output register 27 stores the flow data obtained from the operational section 25 by calculation. That is, the output register 27 is supplied with a signal from the arithmetic circuit 31 and its output is applied to a digital-analog, (D-A) converter 6. Reference numeral 7 designates a device for indicating a signal which is converted into analog value by the D-A converter 6, and an indicator or recorder is normally used therefor. It is possible for the output from the output register 27 to be directly fed to a digital meter to give a digital indication of flow rate.

The integrating circuit 29 is supplied with the output from the operational section 25 and produces an integrated value of the fluid flow. Reference numeral 9 indicates an integrating counter which indicates an integrated flow of fluid which is measured by adding one pulse every time an integrated value reaches a constant value (the above-mentioned minimum value of integrated flow).

Figure 1:
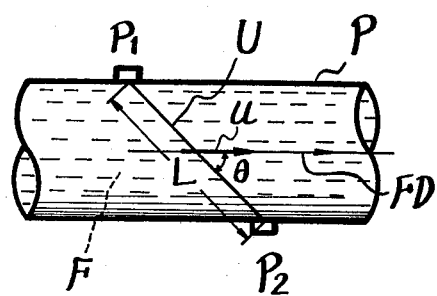
FIG. 1 is a schematic diagram used for explaining the theory of ultrasonic flow measurement.
Figure 2:
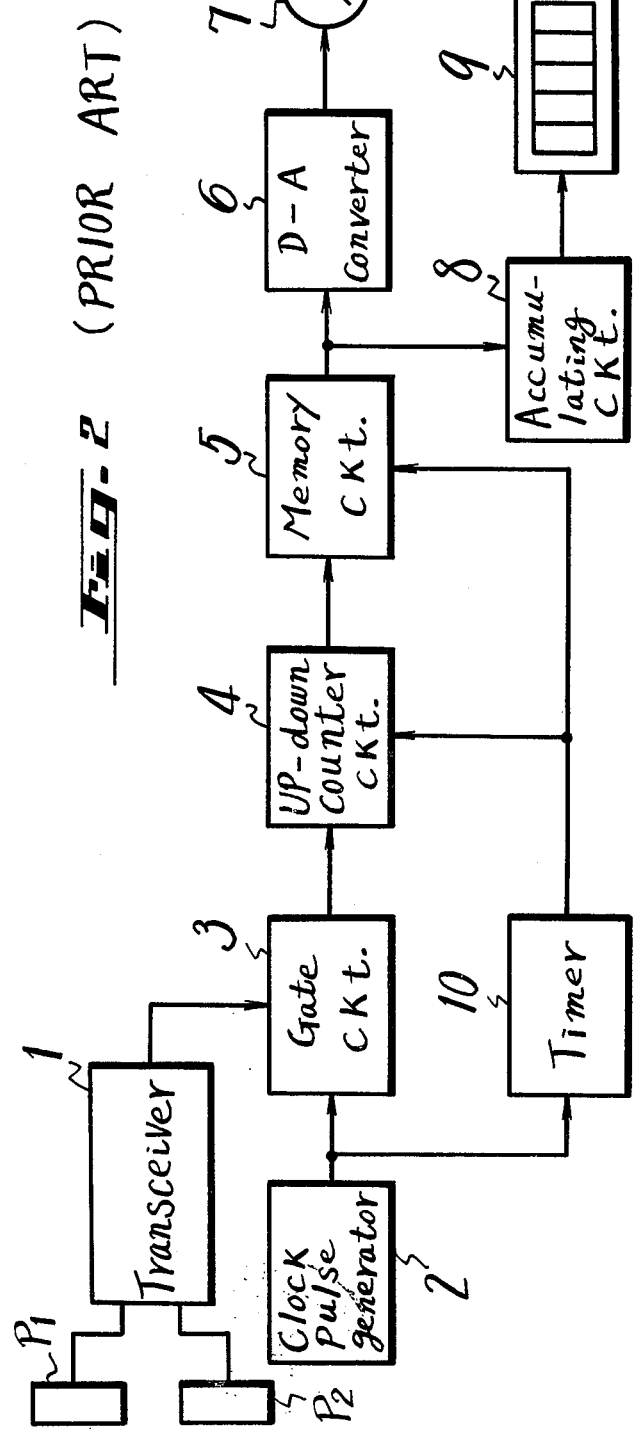
FIGS. 2 and 3 are respectively block diagrams of prior art ultrasonic flow meters.
Figure 3:
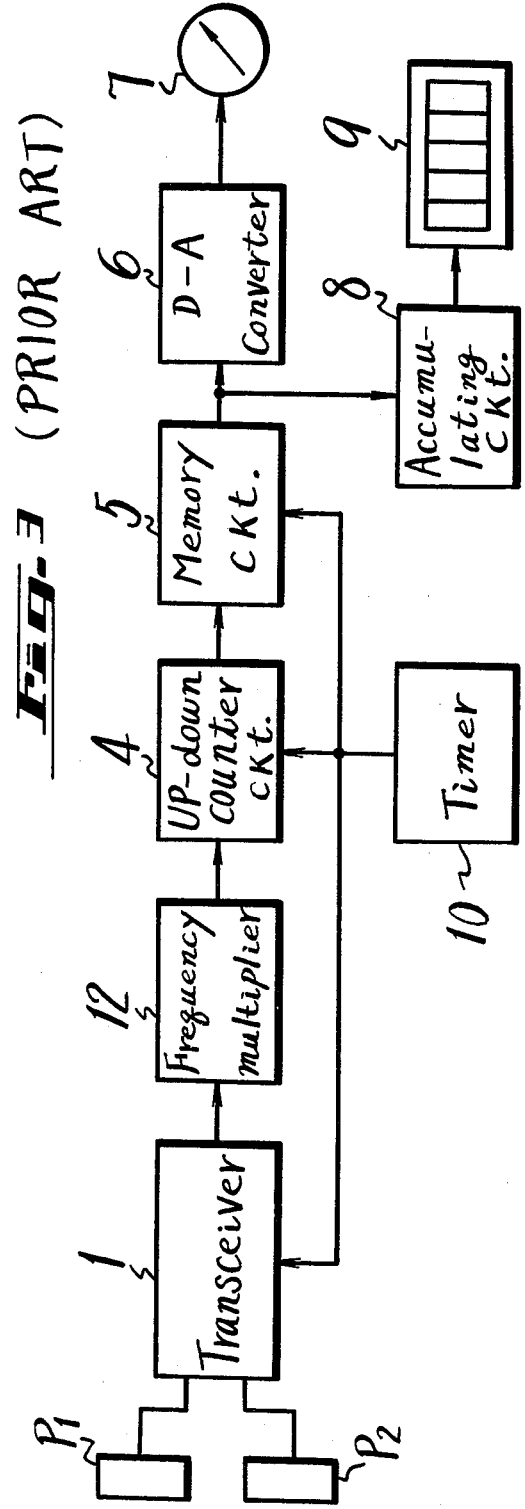

The operation of the operational section 25 will hereinbelow be described with reference to FIGS. 4, 5 and 6. In FIG. 6, symbol or asterisk * indicates steps which are not directly controlled by the operational section 25. If the forward direction FD is selected by the transfer circuit 15, the transceiver 1 performs a sing-around operation in the forward direction FD. The counter 21 counts ($Nt_1/t_o$)'s number of pulses (where $t_1$ is the oscillation period of astable multivibrator 17) as mentioned above. Data $Nt_1/t_o$ of the counter is transferred to the input circuit 23 by the transfer pulse C. FIG. 2i 5D shows the data of the input circuit 23 for FD and BD. As will be apparent from the figure, the data will have a delay of one time period.

A description will now be given for the data of $t_1$. A scale factor $K_1$ of the input register 28 is transferred to the arithmetic circuit 31 by a control pulse $J_1$ shown in FIG. 5J. The data $Nt_1/t_o$ of the input circuit 23 is further transferred by a pulse $J_2$ to carry out the calculation of $K_1f_1 = K_1(t_o/Nt_1)$. Therefore, the value of $K_1f_2$ is calculated during the time interval of the forward direction FD and stored in the internal register of the arithmetic circuit 31 (This operation is made exactly the same as the calculation operation of $K_1f_1$ and stored in the internal register 31 by a control pulse $J_3$, and the description will be omitted.).

The data $K_1f_2$ stored in the internal register 31 is transferred to the arithmetic circuit 31 by a control pulse $J_4$ to carry out the calculation of the difference $K_1(f_1 - f_2)$ between $K_1f_1$ and $K_1f_2$. Thus, by properly selecting the scale factor $K_1$, an average flow $q_1$ at every unit of time becomes $q_1 = K_1(f_1 - f_2)$ and hence can be obtained from the difference between two frequencies. The results obtained is transferred to the output register 27 by a control pulse $J_5$ to provide for renewal of data at every control pulse $J_5$ as shown in FIG. 5G. The output is fed to the D-A converter 6 or another digital indicator as an output signal.

Meanwhile, is another scale factor $K_2$ is selected for the aforesaid $K_1(f_1 - f_2)$, an amount of the fluid flowing during a unit measuring time period (FD + BD) is expressed by $q_2 = K_1K_2(f_1 - f_2)$. This amount $q_2$ is successively integrated to obtain an integrated flow value. That is, an integrated value $\Sigma q_2 = \Sigma K_1K_2(f_1 - f_2)$, which has been stored in the internal register of the arithmetic circuit 31 or the integrating circuit 29 until the present time, is called into the arithmetic circuit 31, and this called value is added with the aforesaid $K_2q_1 = K_1K_2(f_1 - f_2)$ to obtain $\Sigma q_2 + K_2q_1 \to \Sigma q_2$. In this connection, the value $q_2$ which has been integrated until the present time is automatically calculated during an operation to be described later and stored at a predetermined address in the memory.

Let it be assumed that the minimum reading value of the integrating counter 9 is A. When the newly added value of $\Sigma q_2$ exceeds the integrated minimum unit A or $\Sigma q_2 \geq A$ or $q_2' \geq 0$ where $q_2' \Sigma q_2 - A$, the integrating counter 9 counts up and hence $q_2'$ is stored as $\Sigma q_2$ at a predetermined portion of $q_2$. On the contrary, when $\Sigma q_2 < A$ or $q_2' < 0$ is satisfied, the integrating counter 9 does not count up and $\Sigma q_2 = q_2 + A$ is calculated to store $\Sigma q_2$ at a predetermined address and thus a measuring operation of subsequent period has been repeated.

A control pulse $J_7$ is a signal which performs the calculation of $\Sigma q_2 - A$ and starts the operation of evaluating $\Sigma q_2 > A$ or $\Sigma q_2 > A$. When $\Sigma q_2 > A$ is satisfied, the integrating counter 9 counts up by a control pulse $J_8$. Thus, as shown in FIG. 5K, the integrating counter 9 maintains a constant value during at least one time period of FD + BD and the indicating data varies in synchronism with the control pulse $J_8$.

Although the invention has been described with respect to preferred embodiments it is not to be so limited as changes and modifications may be made which are within the full intended scope as defined by the appended claims.

We claim as our invention:

1. An ultrasonic sing-around flow meter comprising:
   (a) a pipe in which a fluid flows;
   (b) a pair of transducers mounted on said pipe and offset longitudinally from each other;
   (c) a transfer circuit connected to said pair of transducers;
   (d) a variable frequency generator connected to said transfer circuit and supplying an input thereto and receiving an output therefrom which controls its repetition frequency;
   (e) a clock pulse generator;
   (f) a timing circuit receiving an input from said clock pulse generator;
   (g) a sequence control circuit connected to said transfer circuit and supplying an output thereto and receiving an input from said clock pulse generator and timing circuit;
   (h) a gate receiving inputs from said clock pulse generator, said variable frequency generator and said sequence control circuit;
   (i) a counter receiving the output of said gate to count the number of clock pulses from said clock pulse generator passed by said gate;
   (j) a logical operational circuit connected to receive outputs of said counter to calculate a difference between a reciprocal of a repetition frequency of said variable frequency generator when a first of said transducers radiates and the other receives and a reciprocal of a repetition frequency when the other radiates and the first receives; and (k) an indicator connected to said logical operational circuit to indicate the velocity of said fluid.

2. An ultrasonic flow meter according to claim 1 further including an integrating circuit connected to said logical operational circuit, and a second indicator connected to said integrating circuit and indicating the quantity of fluid flow.

3. An ultrasonic flow meter according to claim 2 including a frequency divider connected between said gate and said variable frequency generator.

4. An ultrasonic flow meter according to claim 3 including a second gate under the control of said sequence control circuit, said second gate being connected between said counter and said logical operational circuit.

* * * * *